United States Patent
Guo et al.

(10) Patent No.: US 8,494,545 B2
(45) Date of Patent: Jul. 23, 2013

(54) METHOD, APPARATUS, AND SYSTEM FOR ACQUIRING LOAD INFORMATION

(75) Inventors: Xuanyu Guo, Shenzhen (CN); Yanyan Chen, Beijing (CN); Wei Guo, Beijing (CN); Boya LV, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/235,891

(22) Filed: Sep. 19, 2011

(65) Prior Publication Data

US 2012/0064896 A1    Mar. 15, 2012

Related U.S. Application Data

(63) Continuation of application No. PCT/CN2009/070872, filed on Mar. 18, 2009.

(51) Int. Cl.
*H04W 72/00* (2009.01)

(52) U.S. Cl.
USPC .............. 455/453; 455/452.1; 455/452.2

(58) Field of Classification Search
USPC .................... 455/453, 452.1, 452.2
See application file for complete search history.

(56) References Cited

U.S. PATENT DOCUMENTS

| | | | |
|---|---|---|---|
| 2004/0022226 A1* | 2/2004 | Edlund et al. | 370/338 |
| 2007/0232311 A1* | 10/2007 | Kuhn et al. | 455/436 |
| 2008/0080428 A1 | 4/2008 | Jappila et al. | |
| 2009/0253426 A1 | 10/2009 | Qiu et al. | |

FOREIGN PATENT DOCUMENTS

| | | |
|---|---|---|
| CN | 1394018 | 1/2003 |
| CN | 1913467 | 2/2007 |
| CN | 1996909 | 7/2007 |
| CN | 101031132 | 9/2007 |
| CN | 101272588 | 9/2008 |
| CN | 101296418 | 10/2008 |
| CN | 101370162 | 2/2009 |
| CN | 101483452 | 7/2009 |
| EP | 1420604 | 5/2004 |
| EP | 1503606 | 2/2005 |

(Continued)

OTHER PUBLICATIONS

Written Opinion of the International Searching Authority, mailed Dec. 31, 2009, in International Application No. PCT/CN2009/070872 (5 pp.).

(Continued)

*Primary Examiner* — Wayne Cai
*Assistant Examiner* — Michael Irace
(74) *Attorney, Agent, or Firm* — Staas & Halsey LLP.

(57) ABSTRACT

The present invention discloses a method, an apparatus and a system for acquiring load information. In one method, a source access controller and a target access controller can interact through inter-Radio Access Technology (RAT) handover related messages so that a source RAT system can acquire load information of a target RAT system when an inter-RAT Packet Switched (PS) handover is performed. This enables load balancing between different RAT systems so as to guarantee communications quality of the systems. In another method of the present invention, the source access controller and the target access controller interact through a Radio Access Network (RAN) Information Management (RIM) based load information request message and an RIM based load information response message, so that the source RAT system can acquire load information of the target RAT system before an inter-RAT PS domain handover is performed.

4 Claims, 11 Drawing Sheets

FOREIGN PATENT DOCUMENTS

| EP | 2026514 | 2/2009 |
|---|---|---|
| EP | 2 088 795 | 8/2009 |
| JP | 2004349976 | 12/2004 |
| WO | 2008/071088 | 6/2008 |

OTHER PUBLICATIONS

*3rd Generation Partnership Project; Technical Specification Group Radio Access Network; UTRAN Iu interface Radio Access Network Application Part (RANAP) signalling (Release 9)*, 3GPP TS 25.413, V9.1.0, Dec. 2009, pp. 1-401.

*3rd Generation Partnership Project; Technical Specification Group Radio Access Network; UTRAN Iu interface Radio Access Network Application Part (RANAP) signalling (Release 8)*, 3GPP TS 25.413 V8.2.1, Mar. 2009, pp. 1-394.

*Cell Load Information Exchange between different RATs*, 3GPP TSG-RAN WG3#64, San Francisco, CA, May 4-8, 2009, pp. 1-7.

*Exchanging cell load information between RATs by RIM procedure*, Change Request, 3GPP TSG-RAN WG3 Meeting #66, Jeju, South Korea, Nov. 9-13, 2009 (13 pp.).

Extended European Search Report, mailed Mar. 5, 2012, in corresponding European Application No. 09841706.6 (11 pp.).

International Search Report, mailed Dec. 31, 2009, in International Application No. PCT/CN2009/070872 (4 pp.).

EP Office Action issued Nov. 8, 2012 in corresponding European Patent Application No. 09 841 706.6-2412 (5 pages).

Office Action issued Dec. 4, 2012 in corresponding Japanese Patent Application No. 2012-500031 (2 pages) (2 pages English translation).

First Chinese Office Action issued Mar. 14, 2013 in corresponding Chinese Patent Application No. 200980157973.3 (5 pages) (6 pages partial English translation).

Chinese Search Report issued Mar. 8, 2013 in corresponding Chinese Patent Application No. 200980157973.3 (2 pages).

\* cited by examiner

METHOD, APPARATUS, AND SYSTEM FOR ACQUIRING LOAD INFORMATION

CROSS-REFERENCE TO RELATED APPLICATIONS

This application is a continuation of International Application No. PCT/CN2009/070872, filed on Mar. 18, 2009, which is hereby incorporated by reference in this entirety.

FIELD OF THE INVENTION

The present invention relates to the field of mobile communications technologies, and in particular, to a method, an apparatus, and a system for acquiring load information.

BACKGROUND OF THE INVENTION

When a network develops toward a broadband and mobile system, a 3rd Generation Partnership Project (3rd Generation Partnership Project 3GPP) proposes a Long Term Evolution (Long Term Evolution, LTE) solution, namely, an Evolved Universal Mobile Telecommunication System Terrestrial Radio Access Network (Evolved Universal Mobile Telecommunication System Terrestrial Radio Access Network, E-UTRAN), for a mobile access network, and a System Architecture Evolution (System Architecture Evolution, SAE) solution, namely, an Evolved Packet Core (Evolved Packet Core, EPC), for a mobile core network. In LTE/SAE architecture, because some operators expect that, after an Evolved Packet System (Evolved Packet System, EPS) network is deployed, a voice service is still provided by a conventional 2G/3G Radio Access Network (RAN) and a Circuit Switched (Circuit Switched CS) domain core network while the EPS network provides only Packet Switched (Packet Switched, PS) domain data access, the EPS network coexists with the conventional 2G/3G CS domain core network for a period of time. A User Equipment (User Equipment, UE) can access a CS domain core network through a 2G/3GRAN such as a Global System for Mobile Communications (Global System for Mobile Communications, GSM)/Enhanced Data Rate for GSM Evolution (Enhanced Data Rate for GSM Evolution, EDGE) Radio Access Network (Radio Access Network, GERAN) or a Universal Mobile Telecommunication System Terrestrial Radio Access Network (Universal Mobile Telecommunication System Terrestrial Radio Access Network, UTRAN), and access the EPC through the E-UTRAN.

To balance loads between RANs, namely, Radio Access Technology (Radio Access Technology, RAT) systems, an inter-RAT handover is supported. When a UE performs a CS domain handover between 2G/3G RAT systems, a source access controller to which a source cell belongs in a source RAT system can interact with an access controller to which a target cell belongs in a target RAT system through a RELOCATION REQUIRED message, and a RELOCATION COMMAND message or a RELOCATION PREPARATION FAILURE message.

In the above technical solutions, when an inter-RAT PS domain handover is performed or before an inter-RAT CS or PS domain handover is performed, the source RAT system is unable to acquire the load information of the target RAT system, so that inter-RAT load balancing fails to be implemented. As a result, communications quality of the systems fails to be guaranteed.

SUMMARY OF THE INVENTION

Embodiments of the present invention provide a method, an apparatus, and a system for acquiring load information to enable a source RAT system to acquire load information of a target RAT system, so that inter-RAT load balancing can be implemented to guarantee communications quality of the systems.

An embodiment of the present invention provides a method for acquiring load information. The method includes:

when an inter-RAT PS domain handover is performed, sending, through a core network, by a source access controller to which a source cell belongs, an inter-RAT handover request message to a target access controller to which serves a target cell belongs; and receiving, by the source access controller, an inter-RAT handover response message returned by the target access controller according to the inter-RAT handover request message through the core network, where the inter-RAT handover response message carries load information of the target cell.

An embodiment of the present invention provides another method for acquiring load information. The method includes:

before an inter-RAT handover is performed, sending, through a core network, by a source access controller to which a source cell belongs, a RAN Information Management (RAN Information Management, RIM) based load information request message to a target access controller to which a target cell belongs; and receiving, by the source access controller, an RIM based load information response message returned by the target access controller according to the RIM based load information request message through the core network, where the RIM based load information response message carries load information of the target cell.

An embodiment of the present invention provides an access controller. The access controller includes:

a first sending module, configured to send, through a core network, an inter-RAT handover request message to a target access controller to which a target cell belongs when an inter-RAT PS domain handover is performed; and a first receiving module, configured to receive an inter-RAT handover response message returned by the target access controller according to the inter-RAT handover request message through the core network, where the inter-RAT handover response message carries load information of the target cell.

An embodiment of the present invention provides another access controller. The access controller includes:

a third sending module, configured to send, through a core network, an RIM based load information request message to a target access controller to which a target cell belongs before an inter-RAT handover is performed; and a third receiving module, configured to receive an RIM based load information response message returned by the target access controller according to the RIM based load information request message through the core network, where the RIM based load information response message carries load information of the target cell.

An embodiment of the present invention provides a system for acquiring load information. The system includes a first source access controller to which a source cell belongs in a source RAT system and a first target access controller to which a target cell belongs in a target RAT system, where:

the first source access controller is configured to send, through a core network, an inter-RAT handover request message to the first target access controller to which the target cell belongs when an inter-RAT PS domain handover is performed, and receive an inter-RAT handover response message returned by the first target access controller through the core network, where the inter-RAT handover response message carries load information of the target cell; and the first target access controller is configured to receive the inter-RAT handover request message that is sent, through the core network, by the first source access controller to which the source cell belongs, and return the inter-RAT handover response message to the first source access controller through the core network.

An embodiment of the present invention provides another system for acquiring load information. The system includes a second source access controller to which a source cell belongs in a source RAT system and a second target access controller to which a target cell belongs in a target RAT system, where:

the second source access controller is configured to send, through a core network, an RIM based load information request message to the second target access controller to which the target cell belongs before an inter-RAT handover is performed, and receive an RIM based load information response message returned by the second target access controller through the core network, where the RIM based load information response message carries load information of the target cell; and the second target access controller is configured to receive the RIM based load information request message that is sent, through the core network, by the second source access controller to which the source cell belongs, and return the RIM based load information response message to the second source access controller through the core network.

According to the above technical solutions, the source access controller and the target access controller in the embodiments of the present invention can interact through inter-RAT handover related messages so that the source RAT system can acquire load information of the target RAT system when an inter-RAT PS domain handover is performed and therefore load balancing between different RAT systems can be implemented. This guarantees communications quality of the systems. The source access controller and the target access controller in the embodiments of the present invention can also interact through an RIM based load information request message and an RIM based load information response message, so that the source RAT system can acquire load information of the target RAT system before an inter-RAT handover is performed and therefore inter-RAT load balancing can be implemented. This guarantees the communications quality of the systems.

BRIEF DESCRIPTION OF THE DRAWINGS

To better explain the technical solutions of the present invention, the accompanying drawings required in the description of the embodiments of the present invention or the prior art are briefly described. It is apparent that the accompanying drawings illustrate only some exemplary embodiments of the present invention. Those skilled in the art can derive other drawings from these drawings without any creative effort.

DETAILED DESCRIPTION OF THE EMBODIMENTS

To better explain the technical solutions of the present invention, the embodiments of the present invention are described in detail with reference to the accompanying drawings. It is apparent that the embodiments herein are only some exemplary embodiments of the present invention. Based on the embodiments of the present invention, those skilled in the art can derive other embodiments without any creative effort and such other embodiments all fall into the protection scope of the present invention.

For a description purpose, load information of a target cell in a target RAT system is herein referred to as load information of the target RAT system. Likewise, load information of a source cell in a source RAT system is referred to as load information of the source RAT system.

Figure 1:
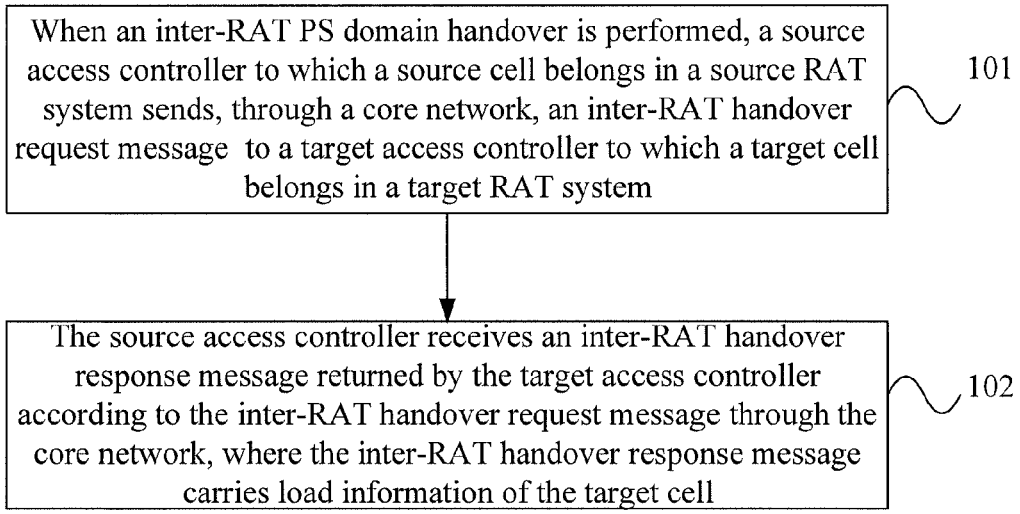
FIG. 1 is a schematic flowchart of a method for acquiring load information according to a first embodiment of the present invention.

FIG. 1 is a flowchart of a method for acquiring load information according to a first embodiment of the present invention. As shown in FIG. 1, the method for acquiring load information in this embodiment may include the following steps:

Step 101: When an inter-RAT PS domain handover is performed, a source access controller to which a source cell belongs in a source RAT system sends, through a core network, an inter-RAT handover request message to a target access controller to which a target cell belongs in a target RAT system.

Step 102: The source access controller receives an inter-RAT handover response message returned by the target access controller according to the inter-RAT handover request message through the core network, where the inter-RAT handover response message carries load information of the target cell.

The source RAT system and the target RAT system in this embodiment may be any two systems of a GERAN, a UTRAN, and an E-UTRAN. The corresponding access controllers are respectively a Base Station System (Base Station System, BSS), a Radio Network Controller (Radio Network Controller, RNC), or an evolved NodeB (evolved NodeB, eNB).

In this embodiment, the bearing of the load information of the target cell may be implemented by a Transparent Container Information Element (Information Element, IE) carried in the inter-RAT handover related messages.

In this embodiment, the source access controller and the target access controller interact through the inter-RAT handover related messages. In this way, when an inter-RAT PS domain handover is performed, the source RAT system can acquire the load information of the target RAT system, so that load balancing can be implemented between different RAT systems. Therefore, communications quality of the systems can be guaranteed.

An inter-RAT PS domain handover between any two of the preceding RAT systems is performed. Access controllers in different RAT systems each interact with the core network through different handover related messages. The specific procedures are described in detail in the following six exemplary embodiments of the present invention.

Figure 2:
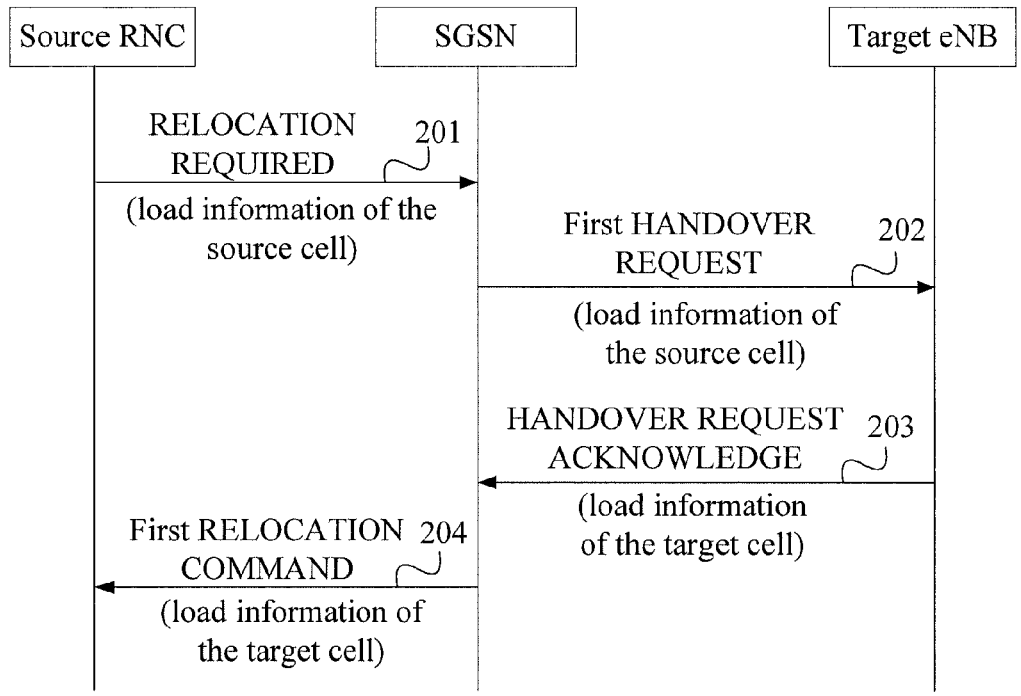
FIG. 2 is a schematic flowchart of a method for acquiring load information according to a second embodiment of the present invention.

FIG. 2 is a schematic flowchart of a method for acquiring load information according to a second embodiment of the present invention. As shown in FIG. 2, this embodiment is applicable to a PS domain handover from a UTRAN to an E-UTRAN. The method for acquiring load information in this embodiment may include the following steps:

Step 201: A source RNC to which a source cell belongs sends a RELOCATION REQUIRED (RELOCATION REQUIRED) message to a Serving GPRS Support Node (Serving GPRS Support Node, SGSN), where the RELOCATION REQUIRED message carries a first Transparent Container IE that carries a source cell load information IE.

Step 202: The SGSN receives the RELOCATION REQUIRED message and sends a first HANDOVER REQUEST message to a target eNB to which a target cell belongs, where the first HANDOVER REQUEST message carries the first Transparent Container IE.

Step 203: The target eNB receives the first HANDOVER REQUEST message and returns a HANDOVER REQUEST ACKNOWLEDGE message to the SGSN, where the HANDOVER REQUEST ACKNOWLEDGE carries a second Transparent Container IE that carries a target cell load information IE.

Step 204: The SGSN receives the HANDOVER REQUEST ACKNOWLEDGE message and returns a first RELOCATION COMMAND message to the source RNC, where the first RELOCATION COMMAND message carries the second Transparent Container IE.

In this embodiment, the first Transparent Container IE may be an Inter-System Information Transparent Container IE or a Source eNB To Target eNB Transparent Container IE. Likewise, the second Transparent Container IE may be an Inter-System Information Transparent Container IE or a Target eNB To Source eNB Transparent Container IE.

In this embodiment, the load information of different RAT systems is exchanged through the source cell load information IE carried in the first Transparent Container IE and the target cell load information IE carried in the second Transparent Container IE In this way, when an inter-RAT PS domain handover from the UTRAN to the E-UTRAN is performed, the UTRAN and the E-UTRAN can acquire load information of the peer system, so that load balancing can be implemented between different RAT systems. Therefore, communications quality of the systems is guaranteed.

Figure 3:
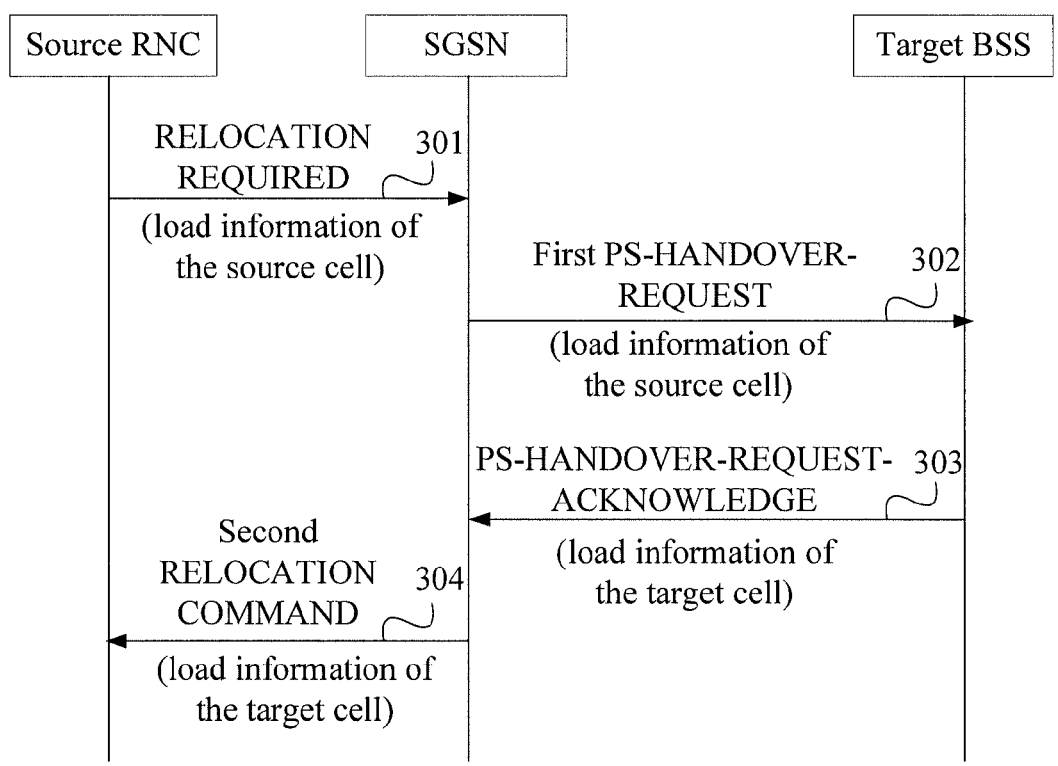
FIG. 3 is a schematic flowchart of a method for acquiring load information according to a third embodiment of the present invention.

FIG. 3 is a schematic flowchart of a method for acquiring load information according to a third embodiment of the present invention. As shown in FIG. 3, this embodiment is applicable to a PS domain handover from a UTRAN to a GERAN. The method for acquiring load information in this embodiment may include the following steps:

Step 301: A source RNC to which a source cell belongs sends a RELOCATION REQUIRED message to an SGSN, where the RELOCATION REQUIRED message carries a first Transparent Container IE that carries a source cell load information IE.

Step 302: The SGSN receives the RELOCATION REQUIRED message and sends a first PS-HANDOVER-REQUEST message to a target BSS to which a target cell belongs, where the first PS-HANDOVER-REQUEST message carries the first Transparent Container IE.

Step 303: The target BSS receives the first PS-HANDOVER-REQUEST message and returns a PS-HANDOVER-REQUEST-ACKNOWLEDGE message to the SGSN, where the PS-HANDOVER-REQUEST-ACKNOWLEDGE message carries a second Transparent Container IE that carries a target cell load information IE.

Step 304: The SGSN receives the PS-HANDOVER-REQUEST-ACKNOWLEDGE message and returns a second RELOCATION COMMAND message to the source RNC, where the second RELOCATION COMMAND message carries the second Transparent Container IE.

In this embodiment, the first Transparent Container IE may be an Inter-System Information Transparent Container IE or a Source BSS To Target BSS Transparent Container IE. Likewise, the second Transparent Container IE may be an Inter-System Information Transparent Container IE or a Target BSS To Source BSS Transparent Container IE.

In this embodiment, the load information of different RAT systems is exchanged through the source cell load information IE carried in the first Transparent Container IE and the target cell load information IE carried in the second Transparent Container IE. In this way, when an inter-RAT PS domain handover from the UTRAN to the GERAN is performed, the UTRAN and the GERAN can acquire load information of the peer system, so that load balancing can be implemented between different RAT systems. Therefore, the communications quality of the systems is guaranteed.

Figure 4:
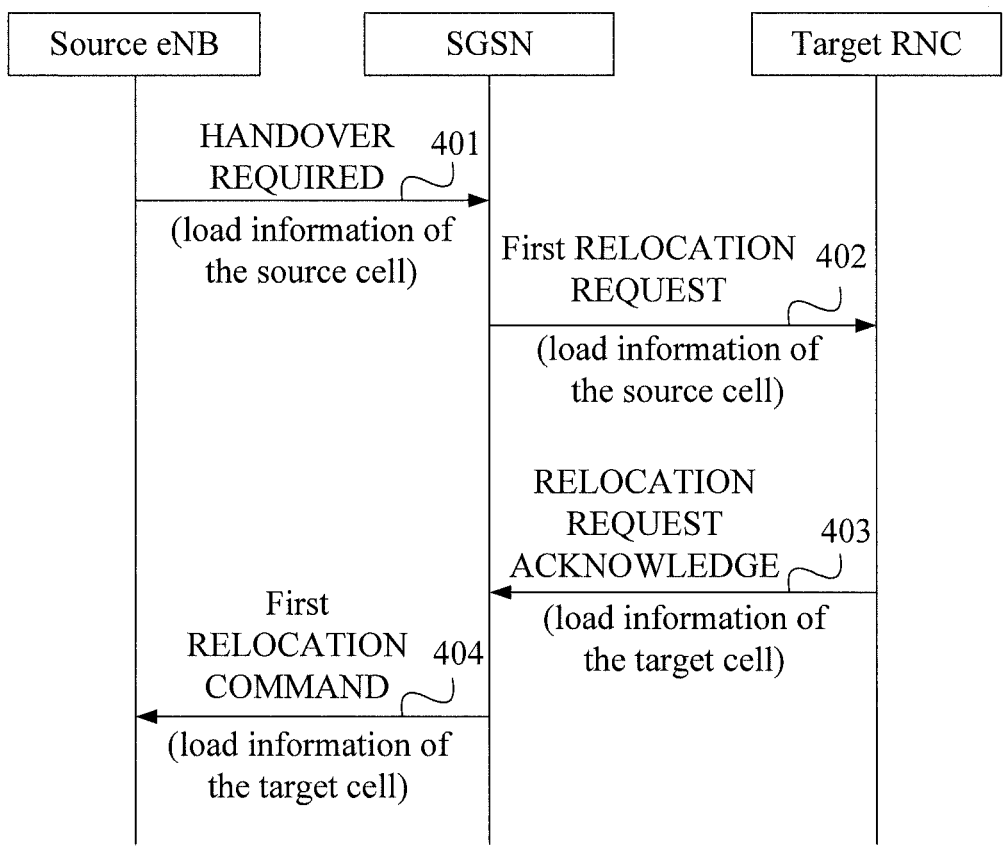
FIG. 4 is a schematic flowchart of a method for acquiring load information according to a fourth embodiment of the present invention.

FIG. 4 is a schematic flowchart of a method for acquiring load information according to a fourth embodiment of the present invention. As shown in FIG. 4, this embodiment is applicable to a PS domain handover from an E-UTRAN to a UTRAN. The method for acquiring load information in this embodiment may include the following steps:

Step 401: A source eNB to which a source cell belongs sends a HANDOVER REQUIRED (HANDOVER REQUIRED) message to an SGSN, where the HANDOVER REQUIRED message carries a first Transparent Container IE that carries a source cell load information IE.

Step 402: The SGSN receives the HANDOVER REQUIRED message and sends a first RELOCATION REQUEST message to a target RNC to which a target cell belongs, where the first RELOCATION REQUEST message carries the first Transparent Container IE.

Step 403: The target RNC receives the first RELOCATION REQUEST message and returns a RELOCATION REQUEST ACKNOWLEDGE message to the SGSN, where the RELOCATION REQUEST ACKNOWLEDGE message carries a second Transparent Container IE that carries a target cell load information IE.

Step 404: The SGSN receives the RELOCATION REQUEST ACKNOWLEDGE message and returns a first RELOCATION COMMAND message to the source eNB, where the first RELOCATION COMMAND message carries the second Transparent Container IE.

In this embodiment, the first Transparent Container IE may be an Inter-System Information Transparent Container IE or a Source RNC To Target RNC Transparent Container IE. Likewise, the second Transparent Container IE may be an Inter-System Information Transparent Container IE or a Target RNC To Source RNC Transparent Container IE.

In this embodiment, the load information of different RAT systems is exchanged through the source cell load information IE carried in the first Transparent Container IE and the target cell load information IE carried in the second Transparent Container IE. In this way, when an inter-RAT PS domain handover from the E-UTRAN to the UTRAN is performed, the E-UTRAN and the UTRAN can acquire load information of the peer system, so that load balancing can be implemented between different RAT systems. Therefore, communications quality of the systems is guaranteed.

Figure 5:
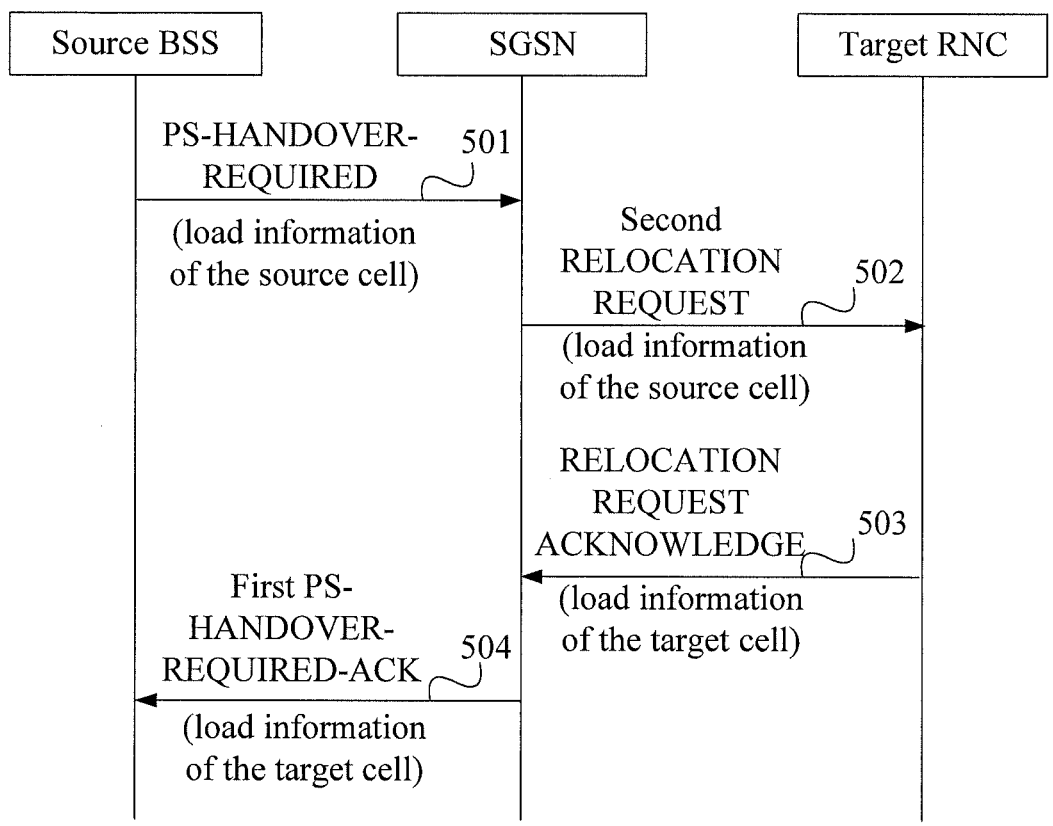
FIG. 5 is a schematic flowchart of a method for acquiring load information according to a fifth embodiment of the present invention.

FIG. 5 is a schematic flowchart of a method for acquiring load information according to a fifth embodiment of the present invention. As shown in FIG. 5, this embodiment is applicable to a PS domain handover from a GERAN to a UTRAN. The method for acquiring load information in this embodiment may include the following steps:

Step 501: A source BSS to which a source cell belongs sends a PS-HANDOVER-REQUIRED (PS-HANDOVER-REQUIRED) message to an SGSN, where the PS-HANDOVER-REQUIRED message carries a first Transparent Container IE that carries a source cell load information IE.

Step 502: The SGSN receives the PS-HANDOVER-REQUIRED message and sends a second RELOCATION REQUEST message to a target RNC to which a target cell belongs, where the second RELOCATION REQUEST message carries the first Transparent Container IE.

Step 503: The target RNC receives the second RELOCATION REQUEST message and returns a RELOCATION REQUEST ACKNOWLEDGE message to the SGSN, where the RELOCATION REQUEST ACKNOWLEDGE message carries a second Transparent Container IE that carries a target cell load information IE.

Step 504: The SGSN receives the RELOCATION REQUEST ACKNOWLEDGE message and returns a first PS-HANDOVER-REQUIRED-ACK (PS-HANDOVER-REQUIRED-ACK) message to the source BSS, where the first PS-HANDOVER-REQUIRED-ACK message carries the second Transparent Container IE.

In this embodiment, the first Transparent Container IE may be an Inter-System Information Transparent Container IE or a Source RNC To Target RNC Transparent Container IE. Likewise, the second Transparent Container IE may be an Inter-System Information Transparent Container IE or a Target RNC To Source RNC Transparent Container IE.

In this embodiment, the load information of different RAT systems is exchanged through the source cell load information IE carried in the first Transparent Container IE and the target cell load information IE carried in the second Transparent Container IE. In this way, when an inter-RAT PS domain handover from the GERAN to the UTRAN is performed, the GERAN and the UTRAN can acquire load information of the peer system, so that load balancing can be implemented between different RAT systems. Therefore, communications quality of the systems is guaranteed.

Figure 6:
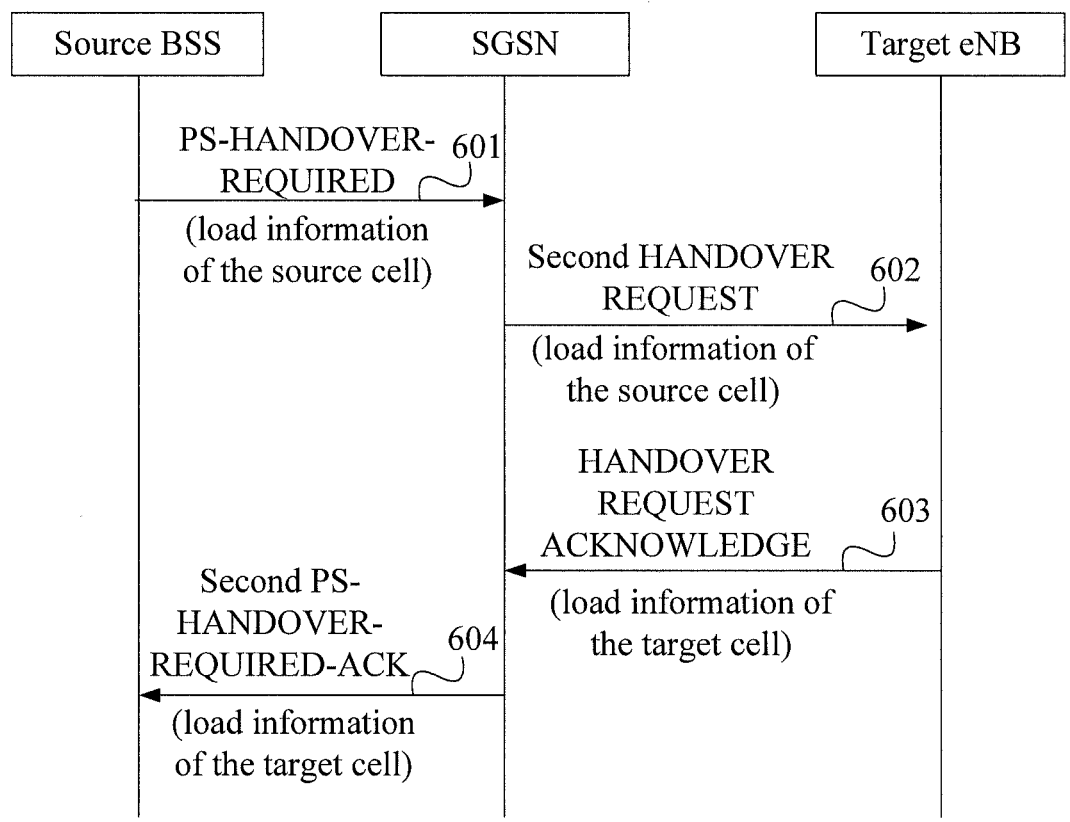
FIG. 6 is a schematic flowchart of a method for acquiring load information according to a sixth embodiment of the present invention.

FIG. 6 is a schematic flowchart of a method for acquiring load information according to a sixth embodiment of the present invention. As shown in FIG. 6, this embodiment is applicable to a PS domain handover from a GERAN to an E-UTRAN. The method for acquiring load information in this embodiment may include the following steps:

Step 601: A source BSS to which a source cell belongs sends a PS-HANDOVER-REQUIRED message to an SGSN, where the PS-HANDOVER-REQUIRED message carries a first Transparent Container IE that carries a source cell load information IE.

Step 602: The SGSN receives the PS-HANDOVER-REQUIRED message and sends a second HANDOVER REQUEST message to a target eNB to which a target cell belongs, where the second HANDOVER REQUEST message carries the first Transparent Container IE.

Step 603: The target eNB receives the second HANDOVER REQUEST message and returns a HANDOVER REQUEST ACKNOWLEDGE message to the SGSN, where the HANDOVER REQUEST ACKNOWLEDGE message carries a second Transparent Container IE that carries a target cell load information IE.

Step 604: The SGSN receives the HANDOVER REQUEST ACKNOWLEDGE message and returns a second PS-HANDOVER-REQUIRED-ACK message to the source BSS, where the second PS-HANDOVER-REQUIRED-ACK message carries the second Transparent Container IE.

In this embodiment, the first Transparent Container IE may be an Inter-System Information Transparent Container IE or a Source eNB To Target eNB Transparent Container IE. Likewise, the second Transparent Container IE may be an Inter-System Information Transparent Container IE or a Target eNB To Source eNB Transparent Container IE.

In this embodiment, the load information of different RAT systems is exchanged through the source cell load information IE carried in the first Transparent Container IE and the target cell load information IE carried in the second Transparent Container IE. In this way, when an inter-RAT PS domain handover from the GERAN to the E-UTRAN is performed, the GERAN and the E-UTRAN can acquire load information of the peer system, so that load balancing can be implemented between different RAT systems. Therefore, communications quality of the systems is guaranteed.

Figure 7:
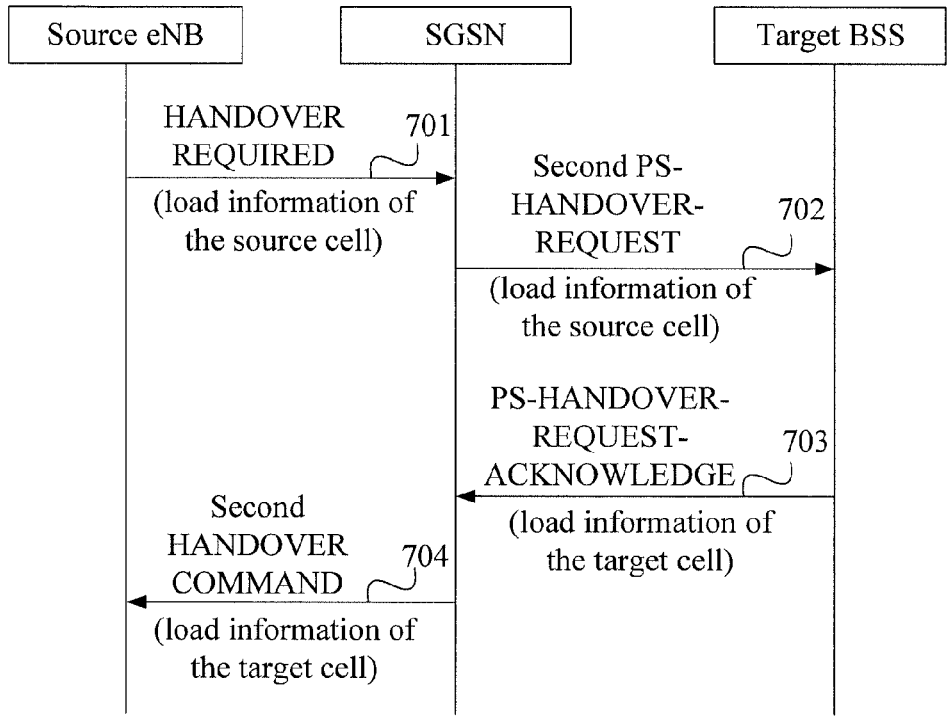
FIG. 7 is a schematic flowchart of a method for acquiring load information according to a seventh embodiment of the present invention.

FIG. 7 is a schematic flowchart of a method for acquiring load information according to a seventh embodiment of the present invention. As shown in FIG. 7, this embodiment is applicable to a PS domain handover from an E-UTRAN to a GERAN. The method for acquiring load information in this embodiment may include the following steps:

Step 701: A source eNB to which a source cell belongs sends a HANDOVER REQUIRED message to an SGSN, where the HANDOVER REQUIRED message carries a first Transparent Container IE that carries a source cell load information IE.

Step 702: The SGSN receives the HANDOVER REQUIRED message and sends a second PS-HANDOVER-REQUEST message to a target BSS to which a target cell belongs, where the second PS-HANDOVER-REQUEST message carries the first Transparent Container IE.

Step 703: The target BSS receives the second PS-HANDOVER-REQUEST message and returns a PS-HANDOVER-REQUEST-ACKNOWLEDGE message to the SGSN, where the PS-HANDOVER-REQUEST-ACKNOWLEDGE message carries a second Transparent Container IE that carries a target cell load information IE.

Step 704: The SGSN receives the PS-HANDOVER-REQUEST-ACKNOWLEDGE message and returns a second HANDOVER COMMAND message to the source eNB, where the second HANDOVER COMMAND message carries the second Transparent Container IE.

In this embodiment, the first Transparent Container IE may be an Inter-System Information Transparent Container IE or a Source BSS To Target BSS Transparent Container IE. Likewise, the second Transparent Container IE may be an Inter-System Information Transparent Container IE or a Target BSS To Source BSS Transparent Container IE.

In this embodiment, the load information of different RAT systems is exchanged through the source cell load information IE carried in the first Transparent Container IE and the target cell load information IE carried in the second Transparent Container IE In this way, when an inter-RAT PS domain handover from the E-UTRAN to the GERAN is performed, the E-UTRAN and the GERAN can acquire load information of the peer system, so that load balancing can be implemented between different RAT systems. Therefore, communications quality of the systems is guaranteed.

It should be noted that the above second to seventh embodiments of the present invention are all successful handover scenarios. Those skilled in the art may easily know that an embodiment of the present invention may also be a failed handover scenario, that is, the second Transparent Container IE is carried in a response message that indicates a failure. Such a scenario is not further described herein.

In the methods for acquiring load information according to the first to seventh embodiments of the present invention, the source access controller and the target access controller can exchange load information only after the source access controller initiates a handover related procedure. In this case, the target cell load information acquired by the source access controller cannot avoid a failure of a current handover due to overload of the target access controller, but can be used only as a guarantee of a next successful handover to implement load balancing between different RAT systems so that the communications quality of the systems is guaranteed.

Figure 8:
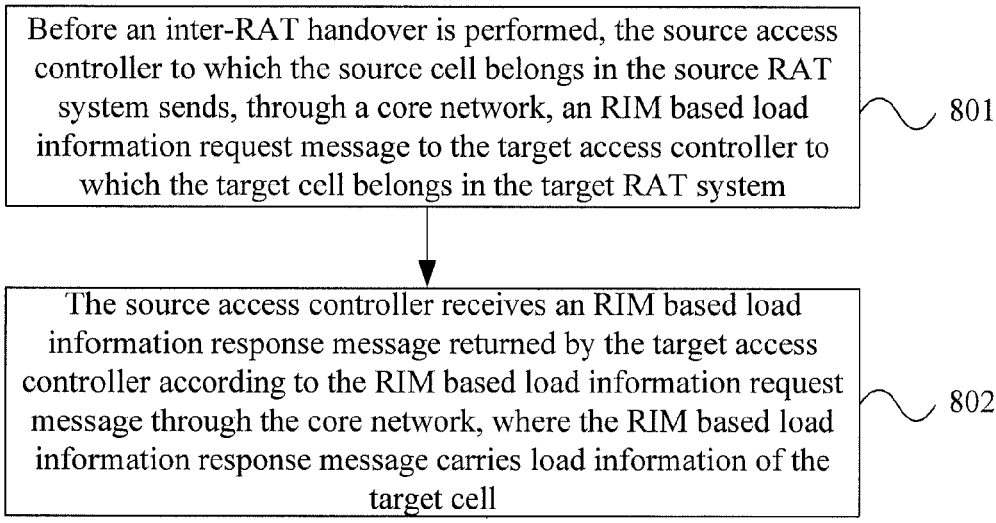
FIG. 8 is a schematic flowchart of another method for acquiring load information according to an eighth embodiment of the present invention.

FIG. 8 is a flowchart of another method for acquiring load information according to an eighth embodiment of the present invention. As shown in FIG. 8, the method for acquiring load information in this embodiment may include the following steps:

Step 801: Before an inter-RAT handover is performed, a source access controller to which a source cell belongs in a source RAT system sends, through a core network, an RIM based load information request message to a target access controller to which a target cell belongs in a target RAT system.

Step 802: The source access controller receives an RIM based load information response message returned by the target access controller according to the RIM based load information request message through the core network, where the RIM based load information response message carries load information of the target cell.

In this embodiment, the source RAT system and the target RAT systems may be any two of a GERAN, a UTRAN, and an E-UTRAN. The corresponding access controllers are respectively a BSS, an RNC, and an eNB.

In this embodiment, the source access controller may send the RIM based load information request message to the target access controller in an event-driven or periodical manner. For example, when the load of the source cell exceeds 60%, the source cell reports a predetermined event to its source access controller to drive the source access controller to send an RIM based load information request message to the target access controller through the core network; or the source access controller is driven to send an RIM based load information request message to the target access controller through the core network at predetermined intervals.

In this embodiment, the source access controller and the target access controller may interact though the RIM based load information request message and the RIM based load information response message, so that the source RAT system acquires the load information of the target RAT system before an inter-RAT handover is performed. Therefore, load balancing can be implemented between different RAT systems and communications quality of the systems is guaranteed.

It should be noted that the number of target cells in the method for acquiring load information according to this embodiment may be one or more than one. Specifically, the target cell or target cells can be indicated by carrying a cell ID of one target cell or a list of cell IDs of multiple target cells in the RIM based load information request message. In the case of multiple target cells, after receiving an RIM based load information request message that carries a list of cell IDs of multiple target cells, the core network locates the target access controller of each target cell according to the target cell IDs in the list of cell IDs. Each target access controller returns an RIM based load information response message that carries load information of the respective target cell to the source access controller to which the source cell belongs. The source access controller and the multiple target access controllers interact though the RIM based load information request message and RIM based load information response message, so that the source RAT system acquires the load information of multiple target RAT systems before an inter-RAT handover is performed. In this way, a target cell can be selected more effectively according to the load information of multiple cells for implementing load balancing between different RAT systems. Therefore, the communications quality of the systems is further guaranteed.

Because no interface is defined between the source access controller and the target access controller, in this embodiment, the load information request message and the load information response message can be transparently transmitted through an SGSN (PS domain) or a Mobile Switching Center (MSC, CS domain) in the core network.

Before An inter-RAT PS domain handover between any two of the preceding RAT systems is performed, the access controllers in different RAT systems each interact with the core network through different RIM related messages. The specific procedures are described in detail in the following six exemplary embodiments of the present invention.

Figure 9:
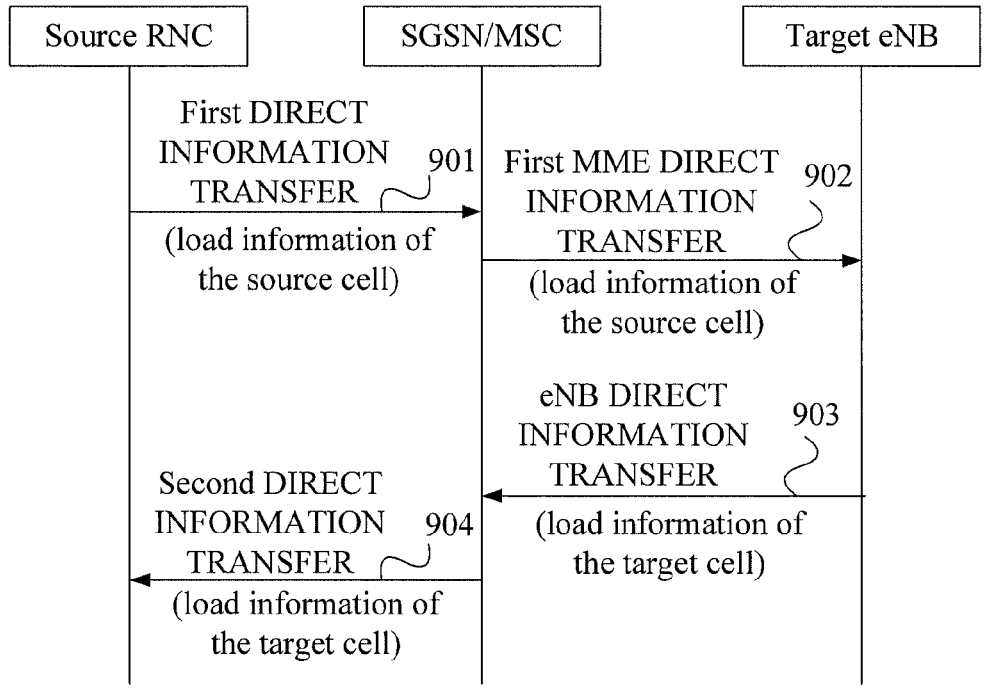
FIG. 9 is a schematic flowchart of another method for acquiring load information according to a ninth embodiment of the present invention.

FIG. 9 is a schematic flowchart of another method for acquiring load information according to a ninth embodiment of the present invention. As shown in FIG. 9, this embodiment is applicable to a handover from a UTRAN to an E-UTRAN.

The method for acquiring load information in this embodiment may include the following steps:

Step 901: A source RNC to which a source cell belongs sends a first DIRECT INFORMATION TRANSFER message to an SGSN or an MSC, where the first DIRECT INFORMATION TRANSFER message carries a first Inter-System Information Transfer Type IE that carries a first RIM Transfer IE and the first RIM Transfer IE carries a source cell load information IE.

Step 902: The SGSN or the MSC receives the first DIRECT INFORMATION TRANSFER message and sends a first MME DIRECT INFORMATION TRANSFER message to a target eNB to which a target cell belongs, where the first MME DIRECT INFORMATION TRANSFER message carries the first Inter-System Information Transfer Type IE.

Step 903: The target eNB receives the first MME DIRECT INFORMATION TRANSFER message and returns an eNB DIRECT INFORMATION TRANSFER message to the SGSN or the MSC, where the eNB DIRECT INFORMATION TRANSFER message carries a second Inter-System Information Transfer Type IE that carries a second RIM Transfer IE and the second RIM Transfer IE carries a target cell load information IE.

Step 904: The SGSN or the MSC receives the eNB DIRECT INFORMATION TRANSFER message and returns a second DIRECT INFORMATION TRANSFER message to the source RNC, where the second DIRECT INFORMATION TRANSFER message carries the second Inter-System Information Transfer Type IE.

In this embodiment, the load information of different RAT systems is exchanged through the source cell load information IE carried in the first Transparent Container IE and the target cell load information IE carried in the second Transparent Container IE. In this way, before an inter-RAT handover from the UTRAN to the E-UTRAN is performed, the UTRAN and the E-UTRAN can acquire load information of the peer system, so that load balancing can be implemented between different RAT systems. Therefore, communications quality of the systems is guaranteed.

Figure 10:
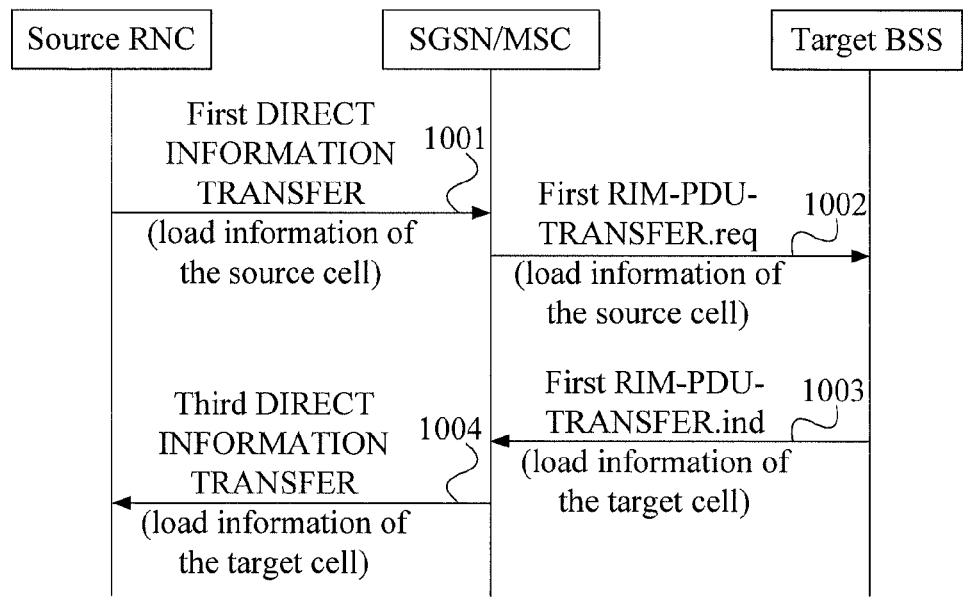
FIG. 10 is a schematic flowchart of another method for acquiring load information according to a tenth embodiment of the present invention.

FIG. 10 is a schematic flowchart of another method for acquiring load information according to a tenth embodiment of the present invention. As shown in FIG. 10, this embodiment is applicable to a handover from a UTRAN to a GERAN. The method for acquiring load information in this embodiment may include the following steps:

Step 1001: A source RNC to which a source cell belongs sends a first DIRECT INFORMATION TRANSFER message to an SGSN or an MSC, where the first DIRECT INFORMATION TRANSFER message carries a first Inter-System Information Transfer Type IE that carries a first RIM Transfer IE and the first RIM Transfer IE carries a source cell load information IE.

Step 1002: The SGSN or the MSC receives the first DIRECT INFORMATION TRANSFER message and sends a first RIM-PDU-TRANSFER.req message to a target BSS to which a target cell belongs, where the first RIM-PDU-TRANSFER.req message carries a first RIM Container IE that carries a source cell load information IE.

Step 1003: The target BSS receives the first RIM-PDU-TRANSFER.req message and returns a first RIM-PDU-TRANSFER.ind message to the SGSN or the MSC, where the first RIM-PDU-TRANSFER.ind message carries a second RIM Container IE that carries a target cell load information IE.

Step 1004: The SGSN or the MSC receives the first RIM-PDU-TRANSFER.ind message and returns a third DIRECT INFORMATION TRANSFER message to the source RNC, where the third DIRECT INFORMATION TRANSFER message carries a third Inter-System Information Transfer Type IE that carries a third RIM Transfer IE and the third RIM Transfer IE carries a target cell load information IE.

In this embodiment, the first RIM-PDU-TRANSFER.req message may include a RAN-INFORMATION-REQUEST PDU message; the first RIM-PDU-TRANSFER.ind message may include a RAN-INFORMATION PDU message.

In this embodiment, the load information of different systems is exchanged by carrying the source cell load information IE in the first RIM Transfer IE and the first RIM Container IE and carrying the target cell load information IE in the second RIM Container IE and the second RIM Transfer IE. In this way, before an inter-RAT handover from the UTRAN to the GERAN is performed, the UTRAN and the GERAN can acquire load information of the peer system, so that load balancing can be implemented between different RAT systems. Therefore, communications quality of the systems is guaranteed.

Figure 11:
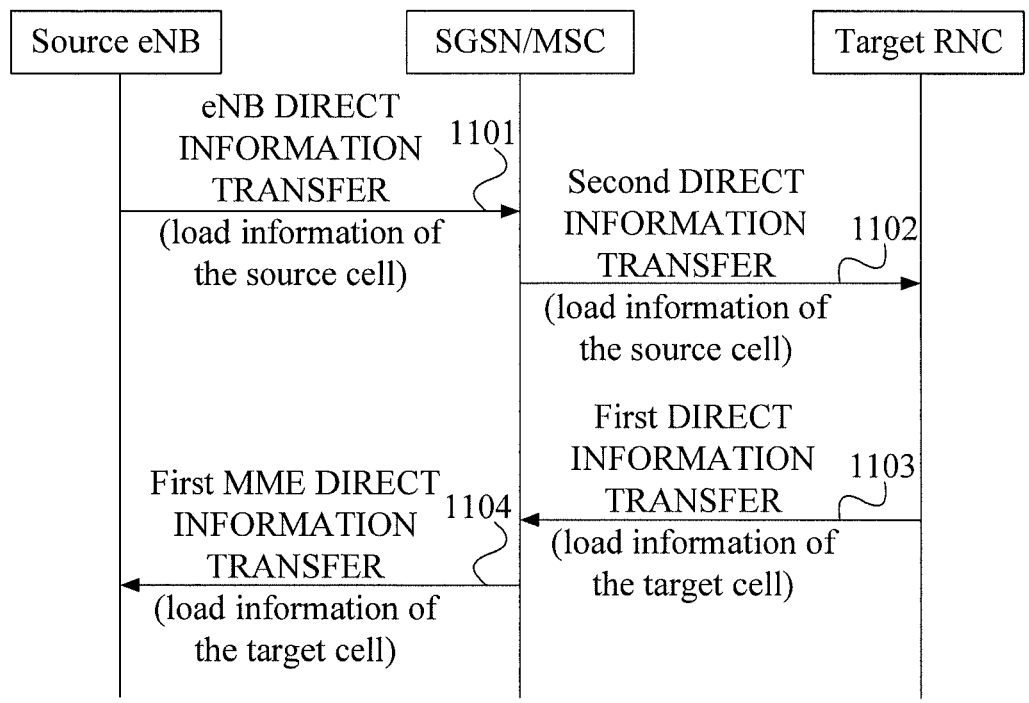
FIG. 11 is a schematic flowchart of another method for acquiring load information according to an eleventh embodiment of the present invention.

FIG. 11 is a schematic flowchart of another method for acquiring load information according to an eleventh embodiment of the present invention. As shown in FIG. 11, this embodiment is applicable to a handover from an E-UTRAN to a UTRAN. The method for acquiring load information in this embodiment may include the following steps:

Step 1101: A source eNB to which a source cell belongs sends an eNB DIRECT INFORMATION TRANSFER message to an SGSN or and MSC, where the eNB DIRECT INFORMATION TRANSFER message carries a second Inter-System Information Transfer Type IE that carries a second RIM Transfer IE and the second RIM Transfer IE carries a source cell load information IE.

Step 1102: The SGSN or the MSC receives the eNB DIRECT INFORMATION TRANSFER message and sends a second DIRECT INFORMATION TRANSFER message to a target RNC to which a target cell belongs, where the second DIRECT INFORMATION TRANSFER message carries the second Inter-System Information Transfer Type IE.

Step 1103: The target RNC receives the second DIRECT INFORMATION TRANSFER message and returns a first DIRECT INFORMATION TRANSFER message to the SGSN or the MSC, where the first DIRECT INFORMATION TRANSFER message carries a first Inter-System Information Transfer Type IE that carries a first RIM Transfer IE and the first RIM Transfer IE carries a target cell load information IE.

Step 1104: The SGSN or the MSC receives the first DIRECT INFORMATION TRANSFER message and returns a first MME DIRECT INFORMATION TRANSFER message to the source eNB, where the first MME DIRECT INFORMATION TRANSFER message carries the first Inter-System Information Transfer Type IE.

In this embodiment, the load information of different RAT systems is exchanged through the source cell load information IE carried in the first Transparent Container IE and the target cell load information IE carried in the second Transparent Container IE. In this way, before an inter-RAT handover from the E-UTRAN to the UTRAN is performed, the E-UTRAN and the UTRAN can acquire load information of the peer system, so that load balancing can be implemented between different RAT systems. Therefore, communications quality of the systems is guaranteed.

Figure 12:
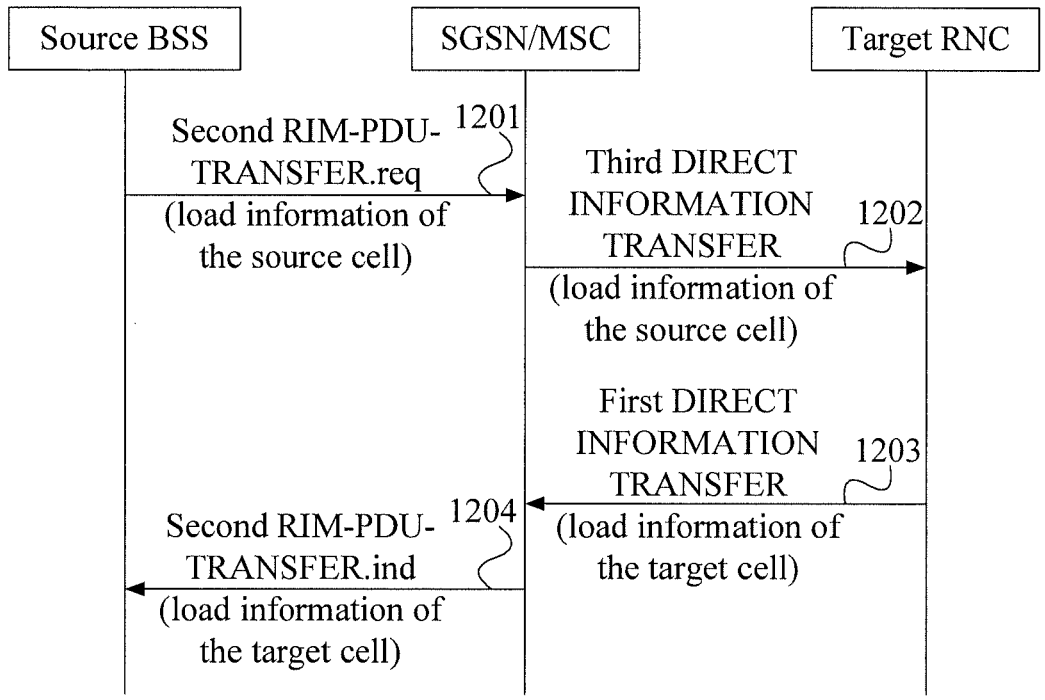
FIG. 12 is a schematic flowchart of another method for acquiring load information according to a twelfth embodiment of the present invention.

FIG. 12 is a schematic flowchart of another method for acquiring load information according to a twelfth embodiment of the present invention. As shown in FIG. 12, this embodiment is applicable to a handover from a GERAN to a UTRAN. The method for acquiring load information in this embodiment may include the following steps:

Step 1201: A source BSS to which a source cell belongs sends a second RIM-PDU-TRANSFER.req message to an SGSN or an MSC, where the second RIM-PDU-TRANSFER.req message carries a third RIM Container IE that carries a source cell load information IE.

Step 1202: The SGSN or the MSC receives the second RIM-PDU-TRANSFER.req message and sends a third DIRECT INFORMATION TRANSFER message to a target RNC to which a target cell belongs, where the third DIRECT INFORMATION TRANSFER message carries a third Inter-System Information Transfer Type IE that carries a third RIM Transfer IE and the third RIM Transfer IE further carries a source cell load information IE.

Step 1203: The target RNC receives the third DIRECT INFORMATION TRANSFER message and returns a first DIRECT INFORMATION TRANSFER message to the SGSN or the MSC, where the first DIRECT INFORMATION TRANSFER message carries a first Inter-System Information Transfer Type IE that carries a first RIM Transfer IE and the first RIM Transfer IE carries a target cell load information IE.

Step 1204: The SGSN or the MSC receives the first DIRECT INFORMATION TRANSFER message and returns a second RIM-PDU-TRANSFER.ind message to the source BSS, where the second RIM-PDU-TRANSFER.ind message carries a fourth RIM Container IE that carries a target cell load information IE.

In this embodiment, the second RIM-PDU-TRANSFER.req message may include a RAN-INFORMATION-REQUEST PDU message; the second RIM-PDU-TRANSFER.ind message may include a RAN-INFORMATION PDU message.

In this embodiment, the load information of different systems is exchanged by carrying the source cell load information IE in the third RIM Container IE and the third RIM Transfer IE and carrying the target cell load information IE in the first RIM Transfer IE and the fourth RIM Container IE. In this way, before an inter-RAT handover from the GERAN to the UTRAN is performed, the GERAN and the UTRAN can acquire load information of the peer system, so that load balancing can be implemented between different RAT systems. Therefore, communications quality of the systems is guaranteed.

Figure 13:
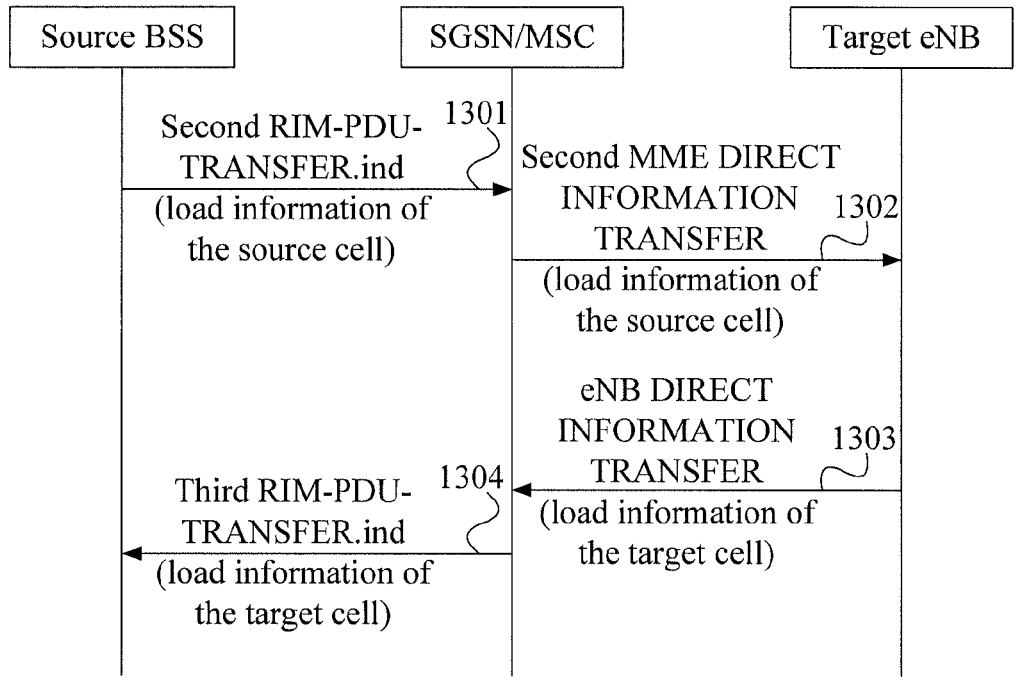
FIG. 13 is a schematic flowchart of another method for acquiring load information according to a thirteenth embodiment of the present invention.

FIG. 13 is a schematic flowchart of another method for acquiring load information according to a thirteenth embodiment of the present invention. As shown in FIG. 13, this embodiment is applicable to a handover from a GERAN to an E-UTRAN. The method for acquiring load information in this embodiment may include the following steps:

Step 1301: A source BSS to which a source cell belongs sends a second RIM-PDU-TRANSFER.req message to an SGSN or an MSC, where the second RIM-PDU-TRANSFER.req message carries a third RIM Container IE that carries a source cell load information IE.

Step 1302: The SGSN or the MSC receives the second RIM-PDU-TRANSFER.req message and sends a second MME DIRECT INFORMATION TRANSFER message to a target eNB to which a target cell belongs, where the second MME DIRECT INFORMATION TRANSFER message carries a third Inter-System Information Transfer Type IE that carries a third RIM Transfer IE and the third RIM Transfer IE further carries a source cell load information IE.

Step 1303: The target eNB receives the second MME DIRECT INFORMATION TRANSFER message and returns an eNB DIRECT INFORMATION TRANSFER message to the SGSN or the MSC, where the eNB DIRECT INFORMATION TRANSFER message carries a second Inter-System Information Transfer Type IE that carries a second RIM Transfer IE and the second RIM Transfer IE carries a target cell load information IE.

Step 1304: The SGSN or the MSC receives the eNB DIRECT INFORMATION TRANSFER message and returns a third RIM-PDU-TRANSFER.ind message to the source BSS, where the third RIM-PDU-TRANSFER.ind message carries a fifth RIM Container IE that carries a target cell load information IE.

In this embodiment, the second RIM-PDU-TRANSFER.req message may include a RAN-INFORMATION-REQUEST PDU message; the third RIM-PDU-TRANSFER.ind message may include a RAN-INFORMATION PDU message.

In this embodiment, the load information of different systems is exchanged by carrying the source cell load information IE in the third RIM Container IE and the third RIM Transfer IE and carrying the target cell load information IE in the second RIM Transfer IE and the fifth RIM Container IE. In this way, before an inter-RAT handover from the GERAN to the E-UTRAN is performed, the GERAN and the E-UTRAN can acquire load information of the peer system, so that load balancing can be implemented between different RAT systems. Therefore, communications quality of the systems is guaranteed.

Figure 14:
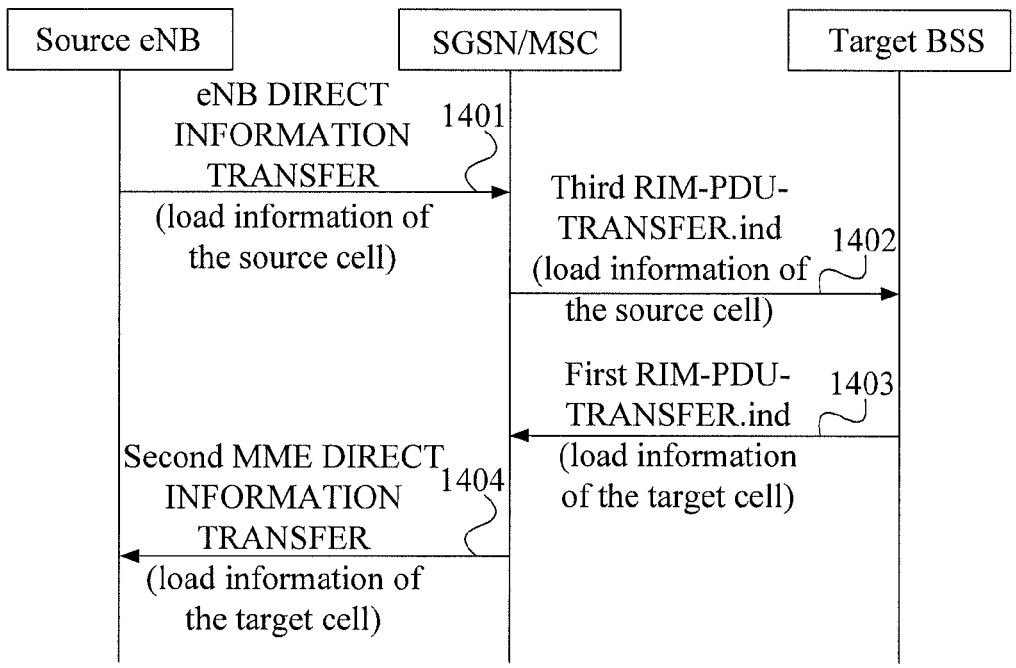
FIG. 14 is a schematic flowchart of another method for acquiring load information according to a fourteenth embodiment of the present invention.

FIG. 14 is a schematic flowchart of another method for acquiring load information according to a fourteenth embodiment of the present invention. As shown in FIG. 14, this embodiment is applicable to a handover from an E-UTRAN to a GERAN. The method for acquiring load information in this embodiment may include the following steps:

Step 1401: A source eNB to which a source cell belongs sends an eNB DIRECT INFORMATION TRANSFER message to an SGSN or an MSC, where the eNB DIRECT INFORMATION TRANSFER message carries a second Inter-System Information Transfer Type IE that carries a second RIM Transfer IE and the second RIM Transfer IE further carries a source cell load information IE.

Step 1402: The SGSN or the MSC receives the eNB DIRECT INFORMATION TRANSFER message and sends a third RIM-PDU-TRANSFER.req message to a target BSS to which a target cell belongs, where the third RIM-PDU-TRANSFER.req message carries a sixth RIM Container IE that carries a source cell load information IE.

Step 1403: The target BSS receives the third RIM-PDU-TRANSFER.req message and returns a first RIM-PDU-TRANSFER.ind message to the SGSN or the MSC, where the first RIM-PDU-TRANSFER.ind message carries a second RIM Container IE that carries a target cell load information IE.

Step 1404: The SGSN or MSC receives the first RIM-PDU-TRANSFER.ind message and returns a second MME DIRECT INFORMATION TRANSFER message to the source eNB, where the second MME DIRECT INFORMATION TRANSFER message carries a third Inter-System Information Transfer Type IE that carries a third RIM Transfer IE and the third RIM Transfer IE further carries a target cell load information IE.

In this embodiment, the third RIM-PDU-TRANSFER.req message may include a RAN-INFORMATION-REQUEST PDU message; the first RIM-PDU-TRANSFER.ind message may include a RAN-INFORMATION PDU message.

In this embodiment, the load information of different systems is exchanged by carrying the source cell load information IE in the second RIM Transfer IE and the sixth RIM Container IE and carrying the target cell load information IE in the second RIM Container ID and the third RIM Transfer IE. In this way, before an inter-RAT handover from the E-UTRAN to the GETRAN is performed, the E-UTRAN and the GERAN can acquire load information of the peer system, so that load balancing can be implemented between different RAT systems. Therefore, communications quality of the systems is guaranteed.

In the methods for acquiring load information according to the eighth to fourteenth embodiments of the present invention, load information is obtained between the source access controller and the target access controller before the source access controller initiates a handover related procedure. In this case, the target cell load information acquired by the source access controller can be a guarantee of success of a current handover and help to effectively avoid a failure of the current handover due to overload of the target access controller. Therefore, load balancing between different RAT systems can be implemented to guarantee the communications quality of the systems.

It should be noted that for a description purpose, the foregoing embodiments of the present invention are all described as a series of actions, but those skilled in the art may understand that the present invention is not limited to a sequence of actions described herein and that according to the present invention, some steps may be performed in other sequences or at the same time. Those skilled in the art may also understand that the embodiments described herein are only some exemplary embodiments of the present invention and that the actions and modules concerned may not be mandatory in the present invention.

In the foregoing embodiments of the present invention, each embodiment has its emphasis. What is not detailed in one embodiment of the present invention is detailed in the related description of another embodiment.

Figure 15:
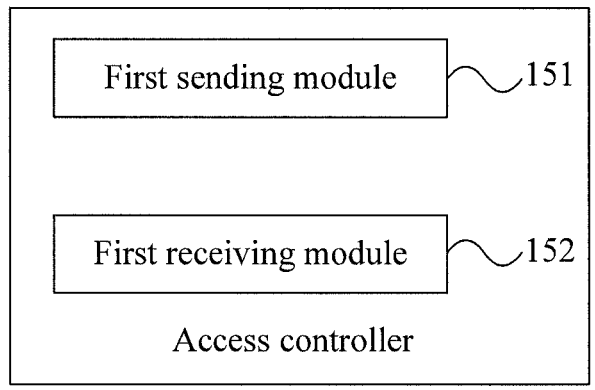
FIG. 15 is a schematic structural diagram of an access controller according to a fifteenth embodiment of the present invention.

FIG. 15 is a schematic structural diagram of an access controller according to a fifteenth embodiment of the present invention. As shown in FIG. 15, the access controller in this embodiment may include a first sending module 151 and a first receiving module 152. The first sending module 151 is configured to send, through a core network, an inter-RAT handover request message to a target access controller to which a target cell belongs when an inter-RAT PS domain handover is performed; the first receiving module 152 is configured to receive an inter-RAT handover response message returned by the target access controller according to the inter-RAT handover request message through the core network, where the inter-RAT handover response message carries load information of the target cell.

The source access controller in the first embodiment of the present invention, the source RNC in the second embodiment of the present invention, the source RNC in the third embodiment of the present invention, the source eNB in the fourth embodiment of the present invention, the source BSS in the fifth embodiment of the present invention, the source BSS in the sixth embodiment of the present invention, and the source eNB in the seventh embodiment of the present invention may all be implemented by the access controller provided in this embodiment.

Figure 16:
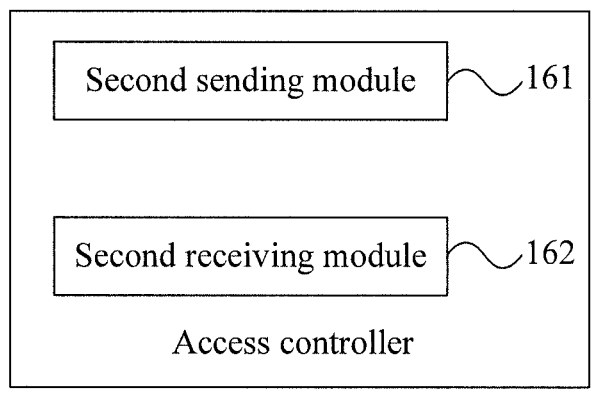
FIG. 16 is a schematic structural diagram of another access controller according to a sixteenth embodiment of the present invention.

FIG. 16 is a schematic structural diagram of another access controller according to a sixteenth embodiment of the present invention. As shown in FIG. 16, the access controller in this embodiment includes a second receiving module 161 and a second sending module 162. The second receiving module 161 is configured to receive, through a core network, an inter-RAT handover request message sent by a source access controller to which a source cell belongs; the second sending module 162 is configured to return an inter-RAT handover response message to the source access controller through the core network, where the inter-RAT handover response message carries load information of a target cell served by the access controller in this embodiment of the present invention.

The target access controller in the first embodiment of the present invention, the target eNB in the second embodiment of the present invention, the target BSS in the third embodiment of the present invention, the target RNC in the fourth embodiment of the present invention, the target RNC in the fifth embodiment of the present invention, the target eNB in the sixth embodiment of the present invention, and the target BSS in the seventh embodiment of the present invention may all be implemented by the access controller provided in this embodiment.

Figure 17:
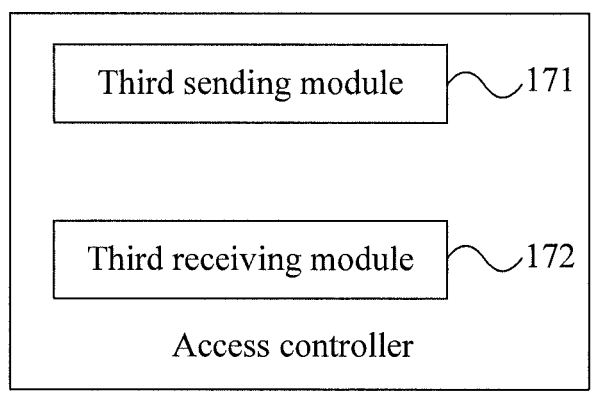
FIG. 17 is a schematic structural diagram of still another access controller according to a seventeenth embodiment of the present invention.

FIG. 17 is a schematic structural diagram of still another access controller according to a seventeenth embodiment of the present invention. As shown in FIG. 17, the access controller in the embodiment of the present invention may include a third sending module 171 and a third receiving module 172. The third sending module 171 is configured to send, through a core network, an RIM based load information request message to a target access controller to which a target cell belongs before an inter-RAT handover is performed; the third receiving module 172 is configured to receive an RIM based load information response message returned by the target access controller according to the RIM based load information request message through the core network, where the RIM based load information response message carries load information of the target cell.

The source access controller in the eighth embodiment of the present invention, the source RNC in the ninth embodiment of the present invention, the source RNC in the tenth embodiment of the present invention, the source eNB in the eleventh embodiment of the present invention, the source BSS in the twelfth embodiment of the present invention, the source BSS in the thirteenth embodiment of the present invention, and the source eNB in the fourteenth embodiment of the present invention may all be implemented by the access controller provided in this embodiment.

Figure 18:
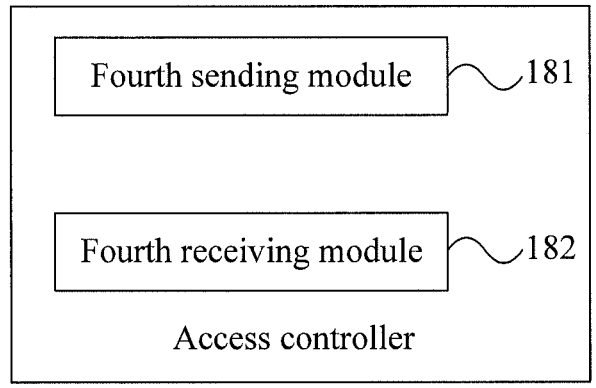
FIG. 18 is a schematic structural diagram of still another access controller according to an eighteenth embodiment of the present invention.

FIG. 18 is a schematic structural diagram of still another access controller according to an eighteenth embodiment of the present invention. As shown in FIG. 18, the access controller in this embodiment may include a fourth receiving module 181 and a fourth sending module 182. The fourth receiving module 181 is configured to receive an RIM based load information request message that is sent, through a core network, by a source access controller to which a source cell belongs; the fourth sending module 182 is configured to return an RIM based load information response message to the source access controller through the core network, where the RIM based load information response message carries load information of a target cell served by the access controller provided in this embodiment of the present invention.

The target access controller in the eighth embodiment of the present invention, the target eNB in the ninth embodiment of the present invention, the target BSS in the tenth embodiment of the present invention, the target RNC in the eleventh embodiment of the present invention, the target RNC in the twelfth embodiment of the present invention, the target eNB in the thirteenth embodiment of the present invention, and the target BSS in the fourteenth embodiment of the present invention may all be implemented by the access controller provided in this embodiment.

Figure 19:
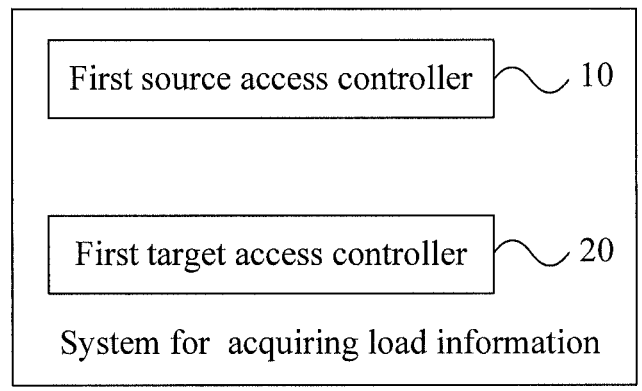
FIG. 19 is a schematic structural diagram of a system for acquiring load information according to a nineteenth embodiment of the present invention.

FIG. 19 is a schematic structural diagram of a system for acquiring load information according to a nineteenth embodiment of the present invention. As shown in FIG. 19, the system for acquiring load information in this embodiment may include a first source access controller 10 to which a source cell belongs in a source RAT system and a first target access controller 20 to which a target cell belongs in a target RAT system.

The first source access controller 10 is configured to send, through a core network, an inter-RAT handover request message to the first target access controller 20 to which the target cell belongs when an inter-RAT PS domain handover is performed, and configured to receive an inter-RAT handover response message returned by the first target access controller 20 through the core network, where the inter-RAT handover response message carries load information of the target cell.

The first target access controller 20 is configured to receive the inter-RAT handover request message that is sent, through the core network, by the first source access controller 10 to which the source cell belongs, and configured to return the inter-RAT handover response message to the first source access controller 10 through the core network.

The source access controller in the first embodiment of the present invention, the source RNC in the second embodiment of the present invention, the source RNC in the third embodiment of the present invention, the source eNB in the fourth embodiment of the present invention, the source BSS in the fifth embodiment of the present invention, the source BSS in the sixth embodiment of the present invention, and the source eNB in the seventh embodiment of the present invention may all be implemented by the first source access controller 10 in the system for acquiring load information in this embodiment; the target access controller in the first embodiment of the present invention, the target eNB in the second embodiment of the present invention, the target BSS in the third embodiment of the present invention, the target RNC in the fourth embodiment of the present invention, the target RNC in the fifth embodiment of the present invention, the target eNB in the sixth embodiment of the present invention, and the target BSS in the seventh embodiment of the present invention may all be implemented by the first target access controller 20 in the system for acquiring load information in this embodiment.

In this embodiment, the source access controller and the target access controller may interact through inter-RAT handover related messages. In this way, when an inter-RAT PS domain handover is performed, the source RAT system can acquire load information of the target RAT system, so that load balancing can be implemented between different RAT systems. Therefore, communications quality of the systems can be guaranteed.

Figure 20:
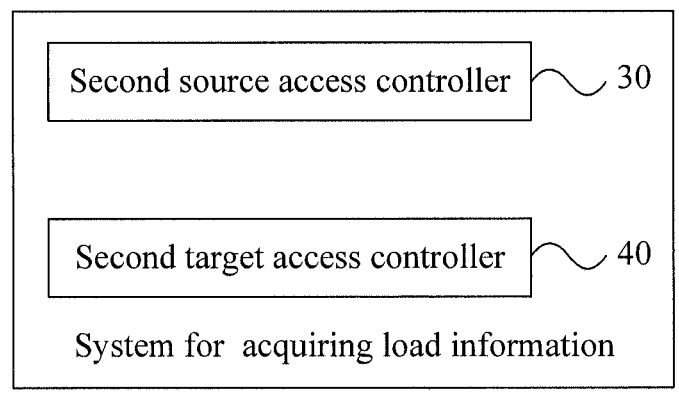
FIG. 20 is a schematic structural diagram of another system for acquiring load information according to a twentieth embodiment of the present invention.

FIG. 20 is a schematic structural diagram of another system for acquiring load information according to a twentieth embodiment of the present invention. As shown in FIG. 20, the system for acquiring load information in this embodiment may include a second source access controller 30 to which a source cell belongs in a source RAT system and a second target access controller 40 to which a target cell belongs in a target RAT system.

The second source access controller 30 is configured to send, through a core network, an RIM based load information request message to the second target access controller 40 to which the target cell belongs before an inter-RAT handover is performed, and configured to receive an RIM based load information response message returned by the second target access controller 40 through the core network, where the RIM based load information response message carries load information of the target cell.

The second target access controller 40 is configured to receive the RIM based load information request message that is sent, through the core network, by the second source access controller 30 to which the source cell belongs, and configured to return the RIM based load information response message to the second source access controller 30 through the core network.

The source access controller in the eighth embodiment of the present invention, the source RNC in the ninth embodiment of the present invention, the source RNC in the tenth embodiment of the present invention, the source eNB in the eleventh embodiment of the present invention, the source BSS in the twelfth embodiment of the present invention, the source BSS in the thirteenth embodiment of the present invention, and the source eNB in the fourteenth embodiment of the present invention may all be implemented by the second source access controller 30 in the system for acquiring load information in this embodiment; the target access controller in the eighth embodiment of the present invention, the target eNB in the ninth embodiment of the present invention, the target BSS in the tenth embodiment of the present invention, the target RNC in the eleventh embodiment of the present invention, the target RNC in the twelfth embodiment of the present invention, the target eNB in the thirteenth embodiment of the present invention, and the target BSS in the fourteenth embodiment of the present invention may all be implemented by the second target access controller 40 in the system for acquiring load information in this embodiment.

In this embodiment, the source access controller and the target access controller may interact though the RIM based load information request message and the RIM based load information response message, so that the source RAT system acquires the load information of the target RAT system before an inter-RAT handover is performed. In this way, load balancing can be implemented between different RAT systems and communications quality of the systems can be guaranteed.

Those skilled in the art may understand that all or a portion of the steps in the methods of the embodiments of the present invention may be implemented by hardware under the instruction of a program. The program may be stored in a computer readable storage medium and when the program is executed, the steps in the methods of the embodiments of the present invention are executed. The storage medium may be any medium that can store program codes, such as a Read Only Memory (Read Only Memory, ROM), a Random Access Memory (RAM), a magnetic disk, or a Compact Disk-Read Only Memory (CD-ROM).

Although the present invention is described in detail through some exemplary embodiments, the present invention is not limited to such embodiments. It is apparent that those skilled in the art may make various modifications and variations to the present invention without departing from the spirit and scope of the present invention. The present invention is intended to cover the modifications and variations provided that they fall within the scope of protection defined by the claims or their equivalents.

What is claimed is:

1. A method for acquiring load information, comprising:
before a handover from a Universal Mobile Telecommunication System Terrestrial Radio Access Network (UTRAN) to an Evolved UTRAN (E-UTRAN) is performed,
sending, by a source Radio Network Controller (RNC) to which a source cell belongs, through a core network, a first DIRECT INFORMATION TRANSFER message to a target access controller to which a target cell belongs, so that a first MME DIRECT INFORMATION TRANSFER message is sent from the target access controller to a target evolved NodeB (eNB) to which the target cell belongs, wherein the target access controller comprises a Serving GPRS Support Node (SGSN) or a Mobile Switching Center (MSC); and receiving, by the source RNC, a second DIRECT INFORMATION TRANSFER message from the SGSN or the MSC, wherein the second DIRECT INFORMATION TRANSFER message is returned by the SGSN or the MSC according to an eNB DIRECT INFORMATION TRANSFER message returned by the target eNB, wherein the first MME DIRECT INFORMATION TRANSFER message and the first DIRECT INFORMATION TRANSFER message carry a first Inter-System Information Transfer Type Information Element (IE), wherein the first Inter-System Information Transfer Type IE carries a cell load reporting request of the target cell and a first RAN Information Management (RIM) Transfer IE which includes a load information IE of the source cell, wherein the eNB DIRECT INFORMATION TRANSFER message and the second DIRECT INFORMATION TRANSFER message carry a second Inter-System Information Transfer Type IE that carries a second RIM Transfer IE, wherein the second RIM Transfer IE carries a load information IE of the target cell.

2. A method for acquiring load information, comprising:

before a handover from an Evolved Universal Mobile Telecommunication System Terrestrial Radio Access Network (E-UTRAN) to a Universal Mobile Telecommunication System Terrestrial Radio Access Network (UTRAN) is performed, sending, by a source evolved NodeB (eNB) to which a source cell belongs, through a core network, an eNB DIRECT INFORMATION TRANSFER message to a target access controller to which a target cell belongs, so that a second DIRECT INFORMATION TRANSFER message to a target Radio Network Controller (RNC) to which the target cell belongs, wherein the target access controller comprises a Serving GPRS Support Node (SGSN) or a Mobile Switching Center (MSC); and receiving, by the source eNB, a first MME DIRECT INFORMATION TRANSFER message from the SGSN or the MSC, wherein the first MME DIRECT INFORMATION TRANSFER message is returned by the SGSN or the MSC according to a second DIRECT INFORMATION TRANSFER message returned by the target RNC, wherein the second DIRECT INFORMATION TRANSFER message and the eNB DIRECT INFORMATION TRANSFER message carry a second Inter-System Information Transfer Type Information Element (IE), wherein the second Inter-System Information Transfer Type IE carries a cell load reporting request of the target cell and a first RAN Information Management (RIM) Transfer IE which includes a load information IE of the source cell, wherein the first MME DIRECT INFORMATION TRANSFER message carries a first Inter-System Information Transfer Type IE, wherein a second RIM Transfer IE carries a load information IE of the target cell.

3. A method for acquiring load information, comprising:

before a handover from a Global System for Mobile Communications (GSM)/Enhanced Data Rate for GSM Evolution (EDGE) Radio Access Network (GERAN) to an Evolved Universal Mobile Telecommunication System Terrestrial Radio Access Network (E-UTRAN) is performed, sending, by a source Base Station System (BSS) to which a source cell belongs, through a core network, a first RIM-PDU-TRANSFER.req message to a target access controller to which a target cell belongs, so that a first MME DIRECT INFORMATION TRANSFER message is sent from the target access controller to a target evolved NodeB (eNB) to which the target cell belongs, wherein the target access controller comprises a Serving GPRS Support Node (SGSN) or a Mobile Switching Center (MSC); and receiving, by the source BSS, a second RIM-PDU-TRANSFER.ind message from the SGSN or the MSC, wherein the second RIM-PDU-TRANSFER.ind message is returned by the SGSN or the MSC according to an eNB DIRECT INFORMATION TRANSFER message returned by the target eNB, wherein the first MME DIRECT INFORMATION TRANSFER message and the first RIM-PDU-TRANSFER.req message carry a first Inter-System Information Transfer Type Information Element (IE), wherein the first Inter-System Information Transfer Type IE carries a cell load reporting request of the target cell and a first RAN Information Management (RIM) Transfer IE which includes a load information IE of the source cell, wherein the eNB DIRECT INFORMATION TRANSFER message and the second RIM-PDU-TRANSFER.ind message carry a second Inter-System Information Transfer Type IE that carries a second RIM Transfer IE, wherein the second RIM Transfer IE carries a load information IE of the target cell.

4. A method for acquiring load information, comprising:

before a handover from an Evolved Universal Mobile Telecommunication System Terrestrial Radio Access Network (E-UTRAN) to a Global System for Mobile Communications (GSM)/Enhanced Data Rate for GSM Evolution (EDGE) Radio Access Network (GERAN) is performed, sending, by a source evolve NodeB (eNB) to which the source cell belongs, through a core network, an eNB DIRECT INFORMATION TRANSFER message to a target access controller to which a target cell belongs, so that a first RIM-PDU-TRANSFER.req message is sent from the target access controller to a target Base Station System (BSS) to which the target cell belongs, wherein the target access controller comprises a Serving GPRS Support Node (SGSN) or a Mobile Switching Center (MSC); and receiving, by the source eNB, a second MME DIRECT INFORMATION TRANSFER message returned by the SGSN or the MSC, wherein the second MME DIRECT INFORMATION TRANSFER message is returned by the SGSN or the MSC according to a second RIM-PDU-TRANSFER.ind message returned by the target BSS, wherein the eNB DIRECT INFORMATION TRANSFER message and the first RIM-PDU-TRANSFER.req message carry a first Inter-System Information Transfer Type Information Element (IE), wherein the first Inter-System Information Transfer Type IE carries a cell load reporting request of the target cell and a first RAN Information Management (RIM) Transfer IE which includes a load information IE of the source cell, wherein the second RIM-PDU-TRANSFER.ind message and the second MME DIRECT INFORMATION TRANSFER message carry a second Inter-System Information Transfer Type IE that carries a second RIM Transfer IE,
wherein a the second RIM transfer IE carries a load information IE of the target cell.

* * * * *

UNITED STATES PATENT AND TRADEMARK OFFICE
CERTIFICATE OF CORRECTION

| | | |
|---|---|---|
| PATENT NO. | : 8,494,545 B2 | |
| APPLICATION NO. | : 13/235891 | |
| DATED | : July 23, 2013 | |
| INVENTOR(S) | : Guo et al. | |

It is certified that error appears in the above-identified patent and that said Letters Patent is hereby corrected as shown below:

In the Claims

Column 21, Line 6, in Claim 4, delete "wherein a the" and insert -- wherein the --, therefor.

Signed and Sealed this
Twenty-second Day of July, 2014

Michelle K. Lee
*Deputy Director of the United States Patent and Trademark Office*